United States Patent [19]

Flippin

[11] 4,260,290
[45] Apr. 7, 1981

[54] CABLE PLOW ASSEMBLY

[75] Inventor: James S. Flippin, Clearwater, Kans.

[73] Assignee: J. I. Case Company, Racine, Wis.

[21] Appl. No.: 9,991

[22] Filed: Feb. 7, 1979

Related U.S. Application Data

[63] Continuation-in-part of Ser. No. 800,592, May 25, 1977, Pat. No. 4,140,425.

[51] Int. Cl.³ .............................................. F16L 1/02
[52] U.S. Cl. .................................. 405/181; 172/40; 172/413; 405/182
[58] Field of Search .............. 405/174, 175, 180, 181, 405/182; 37/98; 172/40, 413, 699

[56] References Cited

U.S. PATENT DOCUMENTS

| | | | |
|---|---|---|---|
| 2,909,134 | 10/1959 | Kniefel | 405/181 |
| 2,943,583 | 7/1960 | Ryan | 405/181 |
| 3,514,960 | 6/1970 | Howard | 405/182 |
| 3,732,932 | 5/1973 | Taube | 172/413 X |
| 3,747,357 | 7/1973 | Erickson et al. | 405/182 |
| 3,870,107 | 3/1975 | Orthman | 172/413 |
| 3,998,276 | 12/1976 | MacMillan | 172/40 X |
| 4,119,157 | 10/1978 | Schuck et al. | 405/181 X |

Primary Examiner—David H. Corbin
Attorney, Agent, or Firm—Cullen, Sloman, Cantor, Grauer, Scott & Rutherford

[57] ABSTRACT

The disclosed vibratory cable plow has a generally horizontal boom supported on transverse horizontal and vertical pivots and a trailer supported on the boom by a vertical pivot. A plow blade is supported on a vibration isolating frame beneath the trailer. In a first embodiment, the rear of the assembly is supported on wheels which are pivoted by piston-cylinders to control the depth of penetration of the plow blade. The first embodiment of the disclosed plow assembly provides remote steering, blade pitch, boom tilt, and depth adjustment and the entire assembly may be raised by piston-cylinders, about the transverse horizontal pivot, for transport. In a second embodiment of the cable plow, the rear of the assembly is supported on V-shaped struts, and the plow frame is supported within the opening formed by the struts on converging upper and lower links. The upper links are longer than the lower links to permit an attack angle for the blade which works well in a variety of soil conditions as well as an elliptical motion of the blade which reduces the forces required to pull the blade through the ground.

2 Claims, 4 Drawing Figures

CABLE PLOW ASSEMBLY

FIELD OF THE INVENTION

The present application is a continuation-in-part of Ser. No. 800,592, filed May 25, 1977, now U.S. Pat. No. 4,140,425.

The present invention relates to plow assemblies for laying flexible cable, pipe and the like underground in the slot cut by the plow. The cable plow assembly of this invention is particularly, although not exclusively, adapted for relatively large cable plows having remote steering and plow blade adjustment.

U.S. Pat. Nos. 3,363,423 and 3,618,237 of Davis assigned to the assignee of the instant application disclose improvements in vibratory cable laying plows having oppositely rotating eccentric weight vibrators transmitting vertical vibration to a plow blade and a plow frame assembly which isolates the vibration from the prime mover. The frame assembly is relatively simple and provides several advantages over the prior art. The cable plows disclosed in the Davis' patents do not, however, have remote steering or the improvements disclosed herein.

Relatively large cable plows having remote steering control are also available commercially as disclosed in U.S. Pat. No. 3,747,357. These larger cable plows, however, have several disadvantages. The control is relatively complex, yet provides only limited adjustment. The cable plow of the present invention provides remote independent steering of the cable plow, remote adjustment of the depth of penetration and pitch of the cable plow blade and the entire assembly may be raised for transport.

SUMMARY OF THE INVENTION

The plow assembly of this invention may be used for laying flexible cable, conduit and pipe underground in the slot cut by the plow. Any suitable prime mover may be utilized, such as a tractor or bulldozer. The plow assembly includes a trailing, generally horizontal boom assembly supported on the rear of the prime mover on transverse horizontal and vertical pivots. In the preferred embodiment, the boom assembly includes a generally horizontal boom supported on the horizontal pivot and a trailer supported on the rear of the boom by a vertical pivot. The plow frame assembly including the plow blade is supported by and beneath the boom assembly, preferably beneath the trailer. In a first embodiment, a pair of ground traversing wheels support the rear of the boom assembly, rearwardly of the plow blade and generally vertically extensible piston-cylinders are connected between the boom assembly and each wheel for raising and lowering the rear of the boom assembly and adjusting the depth of penetration of the blade. The ground traversing wheels may be fixed to the rear of the boom assembly as will be illustrated by the second embodiment of the plow assembly.

In the first embodiment, each wheel is supported on a pivot strut pivotally connected at opposed ends to the wheel axle and the trailer. The piston-cylinder is pivotally connected above the strut at one end and the opposed end is connected to the wheel axle. The wheel is thus rotated about the pivot axis of the strut to the trailer to adjust the depth of penetration of the blade. In the disclosed embodiment, the trailer is generally U-shaped in top elevation having a pair of rearwardly extending arms and each arm is supported by an independently extensible piston-cylinder, permitting adjustment of the tilt angle of the boom assembly. This adjustment may be particularly important in rough uneven terrain. The entire boom assembly may also be raised and lowered by piston-cylinders interconnected between the prime mover and the boom above the horizontal pivot axis. In the first embodiment, a U-shaped yoke is pivotally connected at opposed ends on horiziontal pivot axes to the prime mover. The lift-cylinders are connected between the prime mover and the top of the U-shaped yoke. The boom is then supported on a vertical pivot in the yoke and piston-cylinders are connected between the yoke and the boom permitting remote steering of the rear of the yoke about the vertical pivot. The pitch of the blade is controlled by piston-cylinders interconnected between the blade and the frame support. The blade is thus remotely steered and controlled by piston-cylinders providing complete and accurate adjustment of the blade.

In a second embodiment, the entire boom assembly is raised and lowered about a transverse horizontal axis by piston-cylinders interconnected between the prime mover and a box-shaped yoke connected to the boom. The box-shaped yoke is pivotally connected to the prime mover at opposed ends on the transverse horizontal axis. Lift cylinders are connected between the prime mover and the mid-section of the box-shaped yoke. The boom is supported on a vertical pivot in the yoke and piston-cylinders are connected between the yoke and the boom permitting remote steering of the rear of the boom about the vertical pivot. A trailer portion carrying the plow frame is pivotally supported on the rear of the boom by a vertical pivot pin. The trailer is independently steered by steering piston-cylinders connected between the boom and the trailer.

The trailer portion in the second embodiment is supported by a pair of rearwardly extending V-shaped struts with a ground engaging wheel fixed at the rearward end of each strut. The struts are vertically spaced above the longitudinal axis of the boom, and they provide an opening beneath them for supporting the plow frame assembly.

The plow frame assembly is supported within the enclosure formed by the V-shaped struts on converging upper and lower links. The upper links are longer than the lower links which causes the blade to move in an elliptical motion when vibration is imparted to the blade. The blade works well in a variety of soil conditions and requires less force to pull it through the ground because of the elliptical motion and stabilizing effect received from the V-shaped struts.

Other advantages and meritorious features of the present invention will be more fully understood from the following description of the preferred embodiments. The appended Claims and the drawings, a brief description of which follows.

DESCRIPTION OF THE PREFERRED EMBODIMENTS

As described above, the plow assembly of this invention may be used with any prime mover, however the disclosed embodiments of the plow assembly are particularly adapted for relatively large cable laying plow apparatus requiring remote steering and control of the plow blade. In such applications, a vibrator is preferably used to reduce the force required to pull the blade through the earth. It will be understood, however, that the various improvements disclosed herein may be utilized separately, including smaller cable plow applications.

The prime mover in the disclosed embodiments of the cable plow assembly is a four wheeled tractor 20. It will be understood that the prime mover is not part of the invention disclosed herein and therefore only the rear portion of the tractor including the rear wheels 22 and the wheel axle 24 are shown. The details of the tractor 20 therefore need not be disclosed or described.

Figure 1:
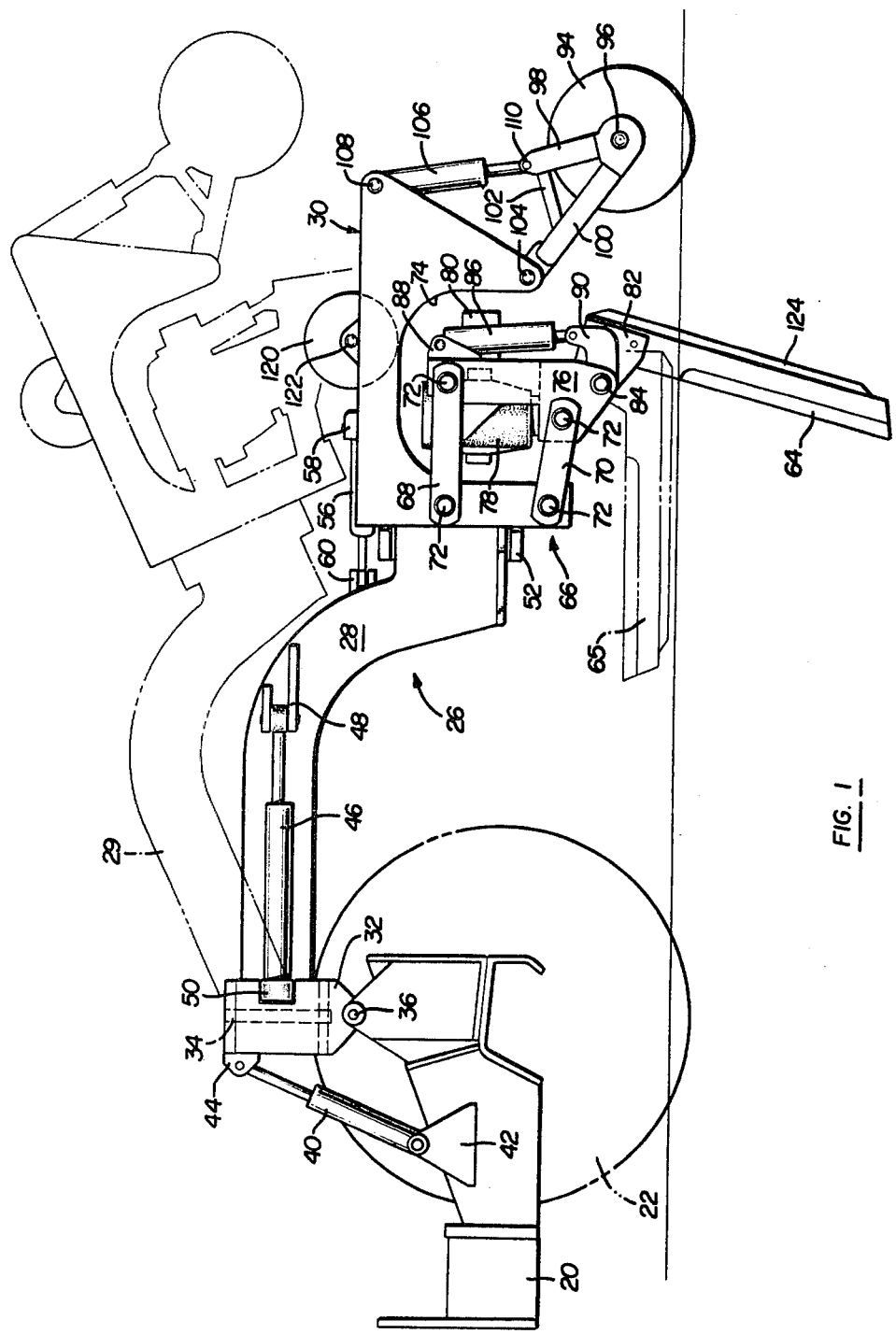
FIG. 1 is a side elevation of one embodiment of the cable plow assembly of this invention.
Figure 2:
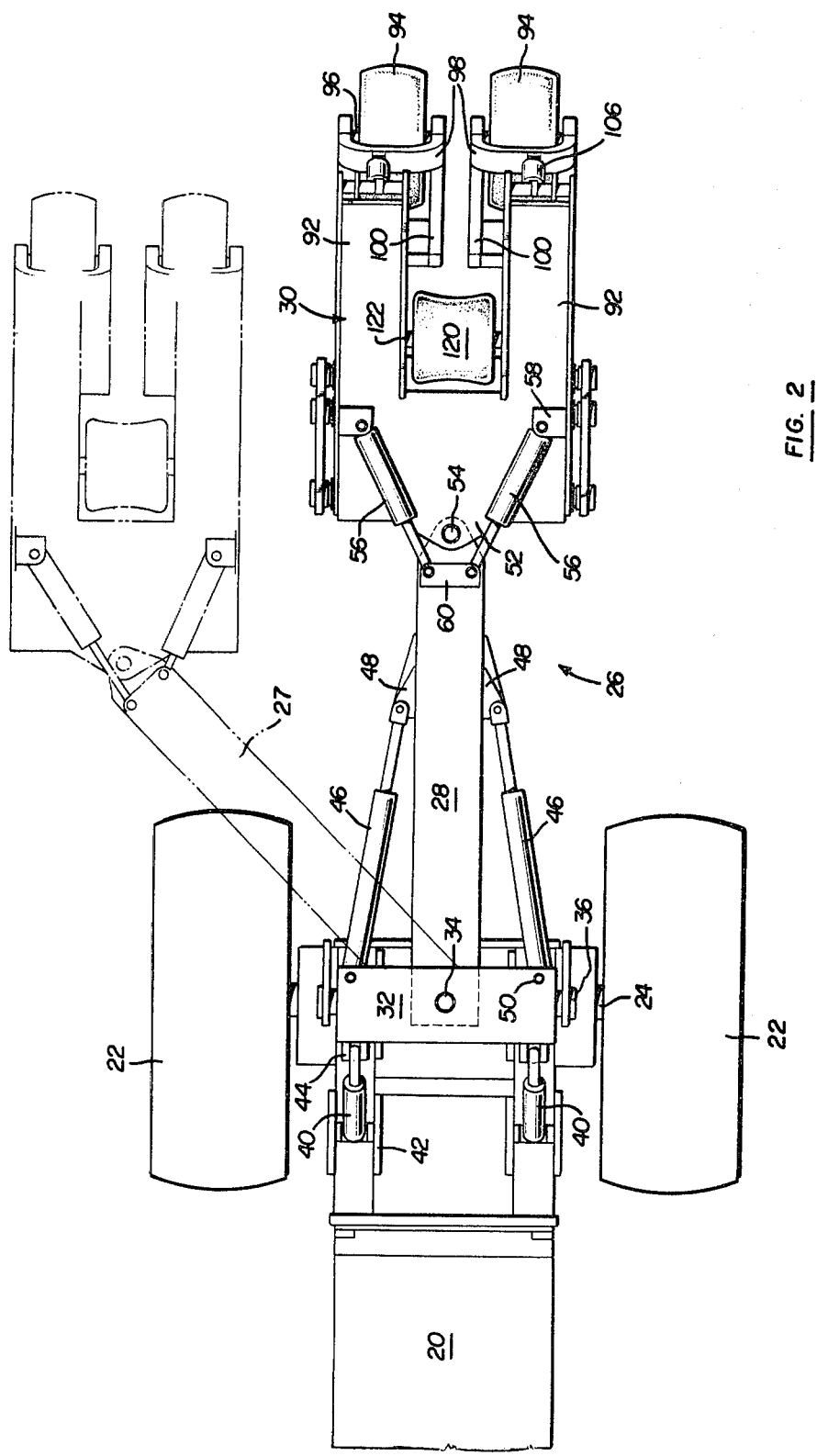
FIG. 2 is a top elevation of the cable plow assembly shown in FIG. 1.

As described, the first embodiment of the cable plow assembly of this invention, illustrated in FIGS. 1-2, includes a boom assembly 26 including a generally horizontal boom 28 and a trailer portion 30. The boom assembly is supported on the prime mover by a universal yoke which permits raising and lowering the boom assembly about a horizontal axis and transverse steering of the assembly about a vertical axis. The yoke is box-shaped having top, bottom and side walls. As shown, a vertical pivot pin 34 is secured through the boom 28 to the top and bottom walls of the yoke, permitting the boom assembly to be laterally steered as shown at 27 in FIG. 2. The side walls of the universal yoke include downwardly extending ears which receive a horizontal pivot pin 36, permitting the boom assembly to be raised and lowered about a horizontal axis as shown at 29 in FIG. 1.

The boom assembly is raised and lowered about horizontal pivot 36 by a pair of lift piston-cylinders 40. The cylinder portions are pivotally connected to the tractor by brackets 42 and the rod portions are pivotally connected to the universal yoke by brackets 44. The lift piston-cylinders 40 are simultaneously retracted to lift the boom assembly as shown at 29 in FIG. 1 or simultaneously extended to lower the boom as shown at 26. The boom assembly may be steered about vertical pivot 34 by extending boom steerage piston-cylinder 46 and retracting the opposed piston-cylinder. The rod portion of piston-cylinder 46 is pivotally connected to a bracket 48 on the boom and the cylinder portion is pivotally connected to the universal yoke at 50. It will be understood that the piston-cylinders utilized in the control mechanism may be conventional hydraulic cylinders each of which include control lines on opposite sides of the piston head. In the preferred embodiment, the control lines extend to the operator position of the prime mover, permitting control of the cable plow from the prime mover. The details, however, of the hydraulic circuit may be conventional and therefore are not shown or described.

The trailer portion 30 is pivotally supported on the boom by a vertical pivot pin 54 which extends through ears 52 on the trailer and the rearward end of the boom 28.

The trailer 30 may be independently steered by trailer steering piston-cylinders 56. The cylinder portions are pivotally connected to brackets 58 on the trailer and the piston rod portions are pivotally connected to bracket 60 on the boom. One cylinder 56 is extended while the opposed cylinder is retracted to steer the trailer. One advantage of independent steering is shown in phantom in FIG. 2. As shown, the upper piston-cylinder 46 in FIG. 2 has been retracted and the lower piston-cylinder has been extended to turn the boom in a counterclockwise direction about vertical pivot 34. Simultaneously, the top piston-cylinder 56 in FIG. 2 has been extended and the lower piston-cylinder has been retracted to guide the trailer in a parallel path. This type of control is very important where the terrain receiving the cable is unsuitable for the tractor or where the cable is to be laid up to a pole, such as a telephone pole.

In the embodiment illustrated in FIG. 1-2, the cable plow blade 64 is preferably supported on a vibration isolating frame beneath the boom assembly. In the disclosed embodiment, the plow is supported on plow frame assembly 66 in a C-shaped opening 74 in trailer 30 as shown in FIG. 1. The plow frame is comprised of two pairs of upper links 68, two pairs of lower links 70 and J-shaped end brackets 76 interconnected by resilient vibration isolating torsion bushings 72. The details of the frame assembly are not disclosed herein because the details may be similar to U.S. Pat. No. 3,618,237 of Davis assigned to the assignee of the instant application. As described in the Davis patent, the vibrator 78 may be a double weight vibrator having two eccentrically mounted weights rotating in opposite direction to provide substantially vertical vibration. The vibrator is mounted on a platform on the J-brackets 76 to impart vertical vibration to the blade 64. The vibrator is driven by a suitable motor 80 which may be connected directly to the drive shaft of the vibrator 78.

The plow blade 64 is mounted adjacent the center or longitudinal axis of the boom on a bracket comprised of plates 82. The plates are mounted on a pivot pin 84 which extends through the J-bracket 76 as shown in FIG. 1. A cylindrical rod way also may be used. The plow blade 64 in the disclosed embodiment may be pitched about the axis of pivot pin 84 to adjust the pitch angle for soil conditions or the blade may be raised to a horizontal position for transport as shown in phantom at 65 in FIG. 1. The blade is pitched by pitch piston-cylinder 86; one piston-cylinder on each side of the frame. The cylinder portion is pivotally supported on bracket 88 on J-bracket 76 and the rod portion is pivotally connected between a pair of L-shaped brackets 90. The L-brackets are connected to pivot pin 84. Thus, the blade may be pitched by simultaneously extending piston-cylinders 86, rotating L-brackets 90 and pivot pin 84 in a clockwise direction, rotating bracket 82 and blade 64 in the same direction.

As shown in FIG. 2, the trailer 30 is generally U-shaped in the top view having a pair of rearwardly extending arms 92. A wheel 94 supports each of the arms for adjustment of the tilt angle of the boom assembly and to adjust the cutting depth of the blade 64. Each of the wheels includes an axle 96 which is rotatably supported in a U-shaped yoke 98 having integral box-shaped struts 100. A reinforcing strut 102 is connected between the yoke 98 and the strut 100 as shown in FIG. 1 to form a triangular support for the trailer. The strut 100 is pivotally connected 104 to the trailer. Piston-cylinders 106 are connected between the trailer and the bite of the U-shaped yokes 98. The cylinder portion is pivotally connected to the trailer at 108 and the rod portion is connected to the bite of the U-shaped yoke at 110. Extension and retraction of the piston-cylinders 106 will thus cause the triangular frame assembly to rotate about pivot axes 104, raising and lowering the rear portion of the boom assembly. In the preferred embodiment, the pistons 106 are simultaneously extended or retracted, the rear portion of the boom assembly is raised and lowered to adjust the cutting depth of the plow blade 64. Where one piston is extended and the opposed piston is retracted, the tilt angle of the boom and trailer may be corrected to correspond to the tractor and accommodate variations in the tilt of the terrain.

Tilt angle correction for the boom 28 is required when, for example, the cable plow is working in a sloping hillside while the pulling tractor is on relatively level ground. As shown in the phantom line position of FIG. 2, the cable plow is laying cable into a downwardly sloping hillside. Under such conditions, the tractor 20 is downhill from the cable plow which is shown in phantom, and the boom assembly 28 is under a twisting stress because it is being laterally steered in an uphill position while the tractor is pulling from a roadbed. To relieve these twisting stresses on the boom and trailer frames, one of the pistons 106 is extended (the downhill piston) and the opposed piston 106 is retracted (the uphill piston). The independent adjustment of the piston-cylinders 106, as taught by the present invention, corrects any boom and trailer tilt angle variations due to operation of the cable plow on uneven terrain. The piston-cylinders 40 are in a float condition when the depth of penetration of the blade 64 is adjusted by the piston-cylinders 105 or when one piston 106 is extended and the opposed piston 106 is retracted to correct the tilt angle of the boom assembly and accommodate variations in the tilt of the terrain.

In operation, flexible cable, conduit or the like may be fed from a reel supported on the tractor over the boom 28 and into the space between the arms 92 to the plow blade. In the disclosed embodiment, a cable cushion 120 in the form of a ribbed tread high floatation tire is rotatably supported on axle 122 between the arms 92 as best shown in FIG. 2. Cable or the like is then threaded over the cable cushion 120 into the cable chute 124 on the trailing or rearward edge of the blade 64. As described above, the vibrator 78 imparts a generally vertical vibration to the blade, reducing the draw bar pull and limiting disturbance of the soil. The vibration is isolated from the prime mover 20 by the vibration isolating plow frame assembly 66. The depth of blade penetration may be adjusted by pistons 106 and the pitch angle of the blade may be adjusted by piston-cylinders 86.

It can be seen from the above description of the operation of the cable plow of this invention that several improvements have been made over the prior art. The plow blade 64 may be independently steered by operation of the piston-cylinders 46 and 56. The entire boom assembly may be raised and lowered for transport or to raise the blade 64 out of the ground by simultaneously retracting piston-cylinders 40. The blade pitch angle may be adjusted by operation of piston-cylinders 86 and the depth of penetration of the blade may be independently adjusted by operation of piston-cylinders 106. It will be understood however, that the disclosed controls may be utilized independently in any particular application and, therefore, the invention disclosed herein is not dependent upon utilization of all of the disclosed controls.

Figure 3:
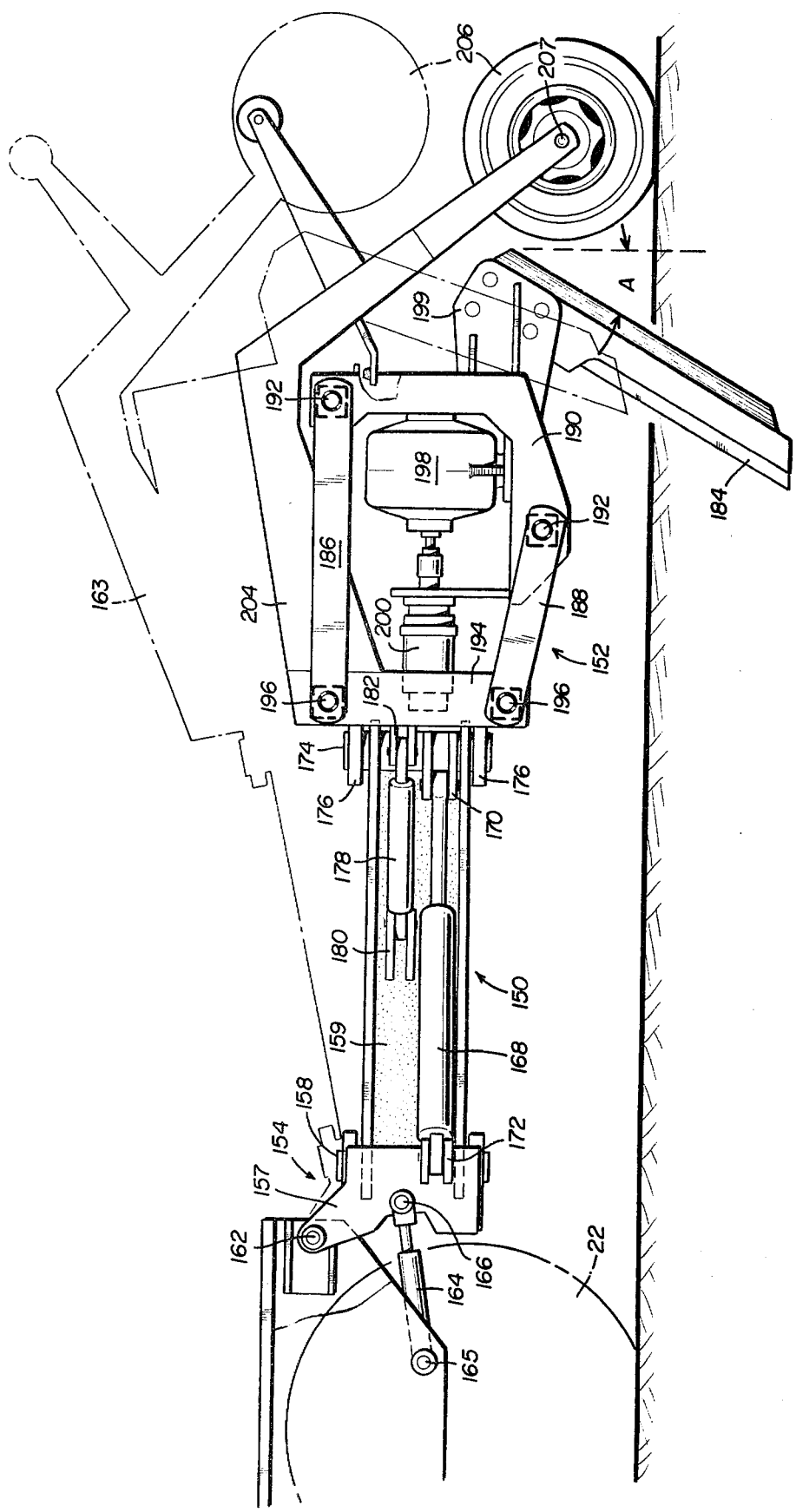
FIG. 3 is a side elevation of a second embodiment of the cable plow assembly of this invention.
Figure 4:
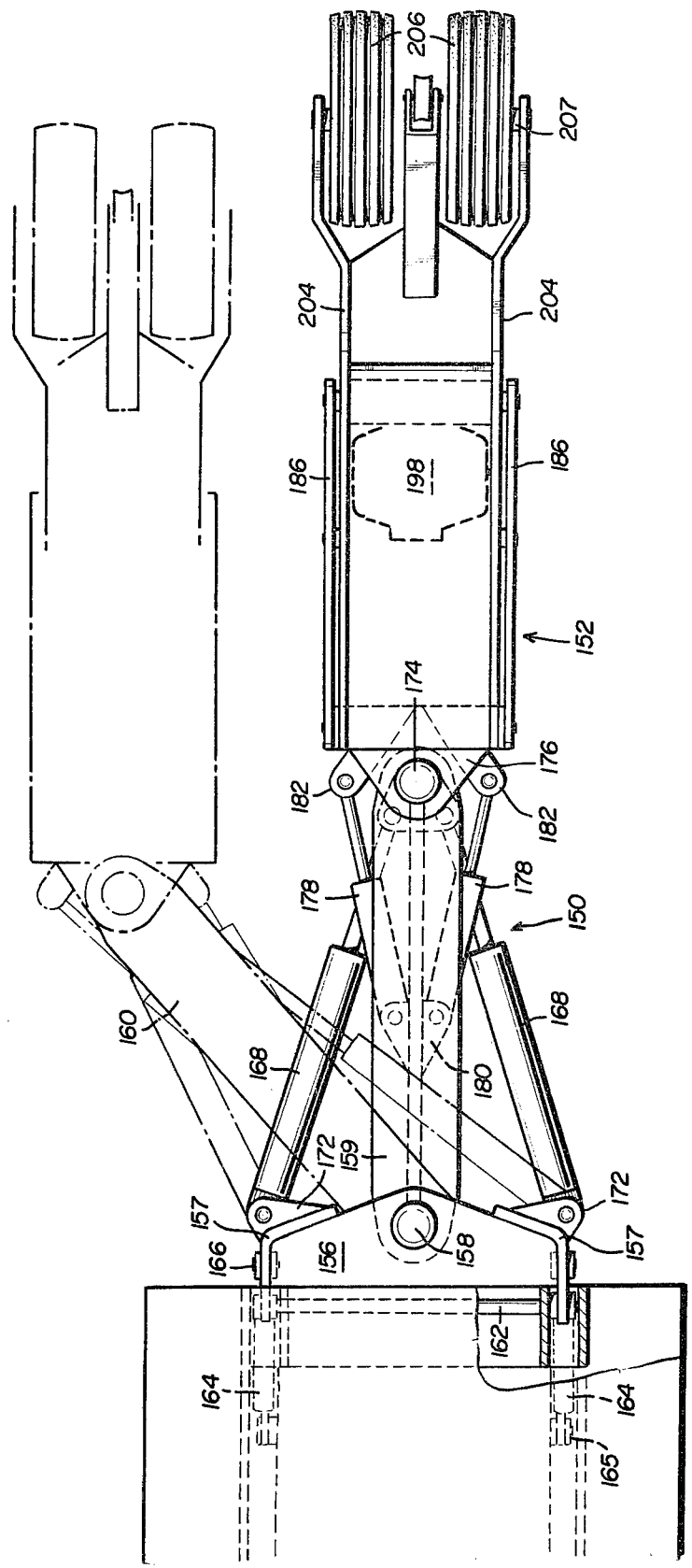
FIG. 4 is a top elevation of a second embodiment of the cable plow assembly shown in FIG. 3.

Referring to FIGS. 3 and 4, a second embodiment of the present invention is illustrated which includes a generally horizontal boom assembly 150 and a trailer portion 152. The boom assembly is supported on the prime mover by a universal yoke 154 which permits raising and lowering of the boom assembly about a horizontal axis and transverse steering of the assembly about a vertical axis. The yoke 154 is box-shaped having top and bottom walls 156 and side walls 157. As illustrated, a vertical pivot pin 158 is secured through the boom 159 permitting the boom assembly 150 to be laterally steered as shown at 160 in FIG. 4. The side walls 157 of the universal yoke include upwardly extending ears which receive a horizontal pivot pin 162 permitting the boom assembly to be raised and lowered about a horizontal axis as shown at 163 in FIG. 3.

The boom assembly is raised and lowered about horizontal pivot 162 by a pair of lift piston cylinders 164. The cylinder portions are pivotally connected to the tractor by pins 165 and the rod portions are pivotally connected to the universal yoke 154 by pins 166. The lift piston-cylinders 164 are simultaneously extended to lift the boom assembly as shown at 163 in FIG. 3 or simultaneously retracted to lower the boom as shown in the whole line position of FIG. 3. The boom assembly may be steered about vertical pivot 158 by extending boom steerage piston cylinder 168 and retracting the opposed piston cylinder. The rod portions of piston-cylinder 168 are pivotally connected to brackets 170 on the boom 159 and the cylinder portions are pivotally connected to the universal yoke by brackets 172. It will be understood that the piston-cylinders utilize in the control mechanism may be conventional hydraulic cylinders, each of which include control lines on opposite sides of the piston head. The details of the hydraulic circuit may be conventional and, therefore, not shown or described.

The trailer portion 152 is pivotally supported on the boom 159 by a vertical pivot pin 174 which extends through ears 176 on the trailer and the rearward end of the boom 159.

The trailer 152 is independently steered by trailer steering piston-cylinders 178. The cylinder portions are pivotally connected to brackets 180 on the boom and the piston rod portions are pivotally connected to brackets 182 on the trailer. One cylinder 178 is extended while the opposed cylinder is retracted to steer the trailer. The operation and controls for steering piston-cylinders 178 are identical to those for steering cylinders 56 of the first embodiment illustrated in FIGS. 1–2.

In the second embodiment of the cable plow illustrated in FIGS. 3–4, the cable plow blade 184 is supported on a vibration isolating frame beneath the boom assembly. The plow frame is comprised of two pairs of pivotal links including two upper links 186 and two lower links 188. Resilient torsional bushings 192 interconnect J-shaped end brackets 190 and the rearward ends of the upper and lower links. The forward ends of links 186 and 188 are pivotally connected to upright columns 194 by resilient torsional bushings 196. The torsional bushings may be identical to the torque cushioning element described in U.S. Pat. No. 3,618,239 of Davis assigned to the assignee of the present invention. The bushings are designed to absorb vibrations while permitting limited pivotal movement of the connected parts.

The blade 184 and vibrator 198 are resiliently suspended on the plow frame for vibrational movement relative to the trailer frame assembly 152 and the supporting vehicle. The plow blade 184 is mounted adjacent the center or longitudinal axis of the boom 159 by a bracket comprised of plates 199 which are fixed to J-shaped brackets 190. The vibrator includes eccentric weights which rotate and which are timed to provide various movements. The vibrator is mounted on a platform on the J-shaped brackets 190 to impart vertical vibration to the blade 184. The vibrator is driven by a suitable motor 200 which is connected directly to the drive shaft of the vibrator.

As best illustrated in FIG. 3, the links 186 and 188 and converge toward the upright columns 194, the upper links 186 being longer than the lower links 188. The convergence of links 186 and 188 in the manner illustrated permits an elliptical motion in the blade and provides an attack angle "A" of the blade which works well for various ground conditions. With the links set as shown in FIG. 3, the horizontal force component of the vibrations generated by the shaker is sufficient to permit the blade to break up hard ground, and the vertical force component of the vibrations is sufficient to work in ground which is relatively soft. Thus, the elliptical motion of the blade reduces the forces required to pull the blade through the ground.

As illustrated in FIG. 3, the trailer 152 for supporting the plow frame is generally U-shaped in side elevation having a pair of rearwardly extending V-shaped struts 204 fixed at their forward ends to the vertical columns 194. A wheel 206 supports each of the struts at their rearward ends, and each wheel includes an axle 207 which is rotatably supported on the end of each respective strut 204. Struts 204 are vertically spaced above the longitudinal axis of boom 159. The open space below the struts provides adequate working room for the elliptical motion of the plow blade and resilient support for the trailer frame because of the relatively long rearward extent of the struts 204.

It will be understood that the disclosed controls may be utilized in either the first or second embodiments of the invention disclosed herein. It will be apparent to those skilled in the art that the foregoing disclosure is exemplary in nature rather than limiting, the invention being limited only by the appended claims.

I claim:

1. A plow assembly for laying an elongated flexible element such as a cable in the slot cut by the plow in the ground, comprising:

a prime mover, a box-shaped yoke having top, bottom and generally vertical side walls pivotally supported on a horizontal pivot axis transverse to the longitudinal axis of the prime mover, and an upwardly inclined extensible piston-cylinder interconnected between said prime mover and said box-shaped yoke, a trailing generally horizontal boom assembly having a forward portion pivotally supported on a vertical pivot supported by said top and bottom walls of said box-shaped yoke, a plow frame assembly supported by and beneath said boom assembly having a ground penetrating blade, said boom assembly including a generally horizontal boom pivotally supported on said vertical pivot on said box-shaped yoke and a trailer supported on the rear of said boom on a vertical pivot, said trailer having two laterally spaced rearwardly extending arms, each arm having a supporting wheel mounted on a transverse horizontal axis, said trailer having a downwardly extending opening generally U-shaped in side elevation and said plow frame being supported within said U-shaped opening, and each of said wheels being supported on the rear of an arm by a strut pivotally connected at opposed ends to said arm and said wheel and a piston-cylinder interconnected above each said strut to said wheel and said arm, each of said wheels being mounted on a horizontal axle generally perpendicular to the longitudinal axis of said boom, the support for each said wheel including a downwardly opening U-shaped yoke rotatably receiving said wheel axle therein, and each of said piston-cylinders interconnected between the bite of said U-shaped yoke and a respective arm above said yoke, and each piston-cylinder being individually controlled to adjust the tilt angle of said trailer to correspond to said prime mover and accommodate uneven terrain such that as said rear trailer encounters uneven terrain, one piston-cylinder being extended and the opposed piston-cylinder being retracted for controlling the tilt of the boom and the plow blade to accommodate the uneven terrain.

2. A plow assembly for laying an elongated flexible element such as a cable in the slot cut by the plow in the ground, comprising:

a prime mover, a trailing generally horizontal boom assembly having a forward portion supported on the rear of said prime mover on a transverse horizontal pivot, said boom assembly comprises a generally horizontal boom and an independently steerable rear trailer pivotally supported on the rear of said boom on a vertical pivot;

a plow frame assembly supported by and beneath said boom assembly having a ground penetrating blade, said plow frame assembly mounted on said rear trailer, said rear trailer having two rearwardly extending generally V-shaped struts which have portions vertically spaced above said horizontal boom, said struts forming a generally U-shaped downward opening in side elevation and said plow frame being supported within said U-shaped opening, two trailing ground traversing wheels being mounted to the rearward ends of said struts on horizontal axles generally perpendicular to the longitudinal axis of said boom, said plow frame having upper and lower links, each of said links being pivotally connected at one end to said trailer, the other ends of said links being pivotally connected in vertically spaced relation to the rear frame members, a vibrator and said blade being suspended and supported on said rear frame members such that said blade is vibrated relative to said vehicle, said upper and lower links converging in spaced relation towards said vehicle and said upper links being of a length greater than said lower links such that the forward cutting edge of said blade is vibrated in an elliptical ground motion reducing the forces required to cut the ground and pull the blade through the ground.

* * * * *